R. A. PERRY.
DIRIGIBLE HEADLIGHT FOR VEHICLES.
APPLICATION FILED OCT. 17, 1921.

1,423,148. Patented July 18, 1922.

INVENTOR
R.A. Perry.
BY
ATTORNEYS

UNITED STATES PATENT OFFICE.

RAYMOND A. PERRY, OF OAKLAND, CALIFORNIA.

DIRIGIBLE HEADLIGHT FOR VEHICLES.

1,423,148.  Specification of Letters Patent.  Patented July 18, 1922.

Application filed October 17, 1921. Serial No. 508,278.

*To all whom it may concern:*

Be it known that I, RAYMOND A. PERRY, a citizen of the United States, residing at the city of Oakland, in the county of Alameda and State of California, have invented certain new and useful Improvements in Dirigible Headlights for Vehicles, of which the following is a specification.

This invention relates to headlights for vehicles, and particularly to a single dirigible headlight for motor driven vehicles for use in connection with the usual stationary headlights.

The invention has for its principal object to provide a dirigible headlight operated by the vehicle steering gear to swing in the direction of the front vehicle wheels when the same are turned, and it is positioned between the universally used stationary headlights, and preferably carried low to the road surface on the front vehicle axle; to provide a simple operating connection between the headlight and the vehicle steering gear reach rod; and to provide a simple construction for headlight mounting adapted to be manufactured at little cost, and for installation, also at little cost on the majority of vehicles now manufactured and sold without altering the vehicle in any manner.

With the above mentioned and other objects in view, the invention consists in the novel construction and combination of parts hereinafter described, illustrated in the accompanying drawings, and set forth in the claim hereto appended, it being understood that various changes in the form, proportion, size and minor details of construction within the scope of the claim may be resorted to without departing from the spirit or sacrificing any of the advantages of the invention.

To more fully comprehend the invention, reference is directed to the accompanying drawings, wherein:—

Figure 1:
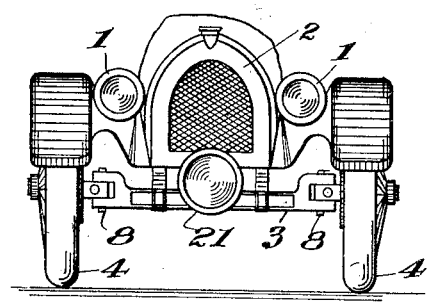
Figure 1 is a view in front elevation of an automobile equipped with my invention.
Figure 2:
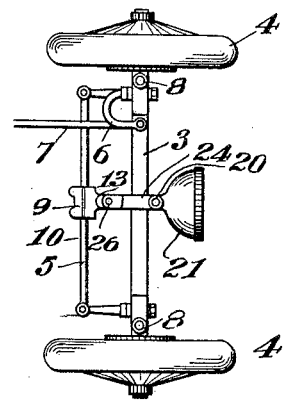
Figure 2 is a view in top plan of the front axle of a vehicle illustrating a portion of the steering gear and the dirigible lamp secured to the axle.
Figure 4:
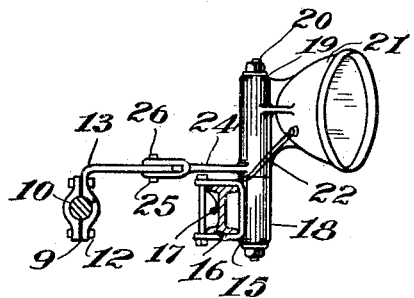
Figure 4 is a view in side elevation of the structure illustrated in Figure 3.
Figure 3:
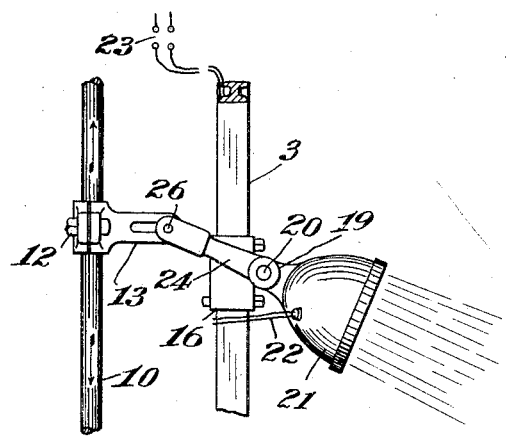
Figure 3 is a view in detail plan of the construction illustrated in Figure 2.

In the drawings, wherein like characters of reference designate corresponding parts, the numerals 1 indicate the usual stationary vehicle headlights positioned one on each side of the radiator 2, and supported preferably on the vehicle frame above the front axle 3. The axle carries the usual spindle supported wheels 4 pivotally connected by a reach rod 5, and to one of the spindles is pivotally connected through an arm or goose neck 6 a steering rod 7. The steering rod is operated in any well known manner to cause the parts 5 and 6 to swing the wheels 4 on their spindle fulcrums 8 to properly steer the vehicle. The reach rod 5 is illustrated as extending parallel with and in rear of the axle 3, and to the same, preferably midway of its length is detachably secured a clamping member 9, constructed of separatable co-operating parts 10 and 11 held together on the rod by bolts 12. Upwardly and forwardly from the part 11 extends a flange or part 13 terminating in rear of the front axle 3 and formed with a longitudinal slot 14 adjacent its outer end. A supporting bracket 15 consisting of a substantial U frame 16 is slipped over the front axle 3 approximately midway of its length, and the inner rear ends of said U bracket are drawn together by a clamping bolt 17. The bracket 15 on its front end is provided with an integral tubular boss 18, on which is adapted to rest a tubular vertically disposed post 19, the same being held on the boss by a bolt 20 uniting the two together and forming a fulcrum point or member for the post 19. The post 19 carries a suitable lamp 21 extending laterally from one side thereof and preferably formed integral therewith, and said lamp is supplied with current through a suitable conductor 22 extending longitudinally of the axle 3, and containing within convenient reach of the vehicle operator a controlling switch 23. Rearwardly from the post 19 extends in a horizontal plane an arm 24 forked at its end as at 25 for receiving the free end of the part 13, and through said forked portions of the arm 25 extends a bolt 26 operating in the slot 14, and which affords a sliding fulcrum connection between the parts 13 and 24.

It will be observed that by the employment of my present invention, a dirigible light or lamp close to the road surface is provided at the front end of the vehicle between and below the usual stationary headlights enabling the illuminating of the road particularly when the vehicle is rounding corners or is in mountain travel, and the use of said lamp does not in any manner interfere with the permanent headlights supplied with vehicles as regular equipment.

Having thus described my invention, what I claim as new and desire to secure by Letters Patent is:—

A dirigible headlight for vehicles, comprising a supporting bracket adapted for attachment to a front vehicle axle and provided on one face with an integral boss terminating approximately flush with the upper surface of the axle and formed with a vertical bore, a tubular post extending upwardly from and rotatably mounted on said boss, a bolt passing through said tubular post and boss and providing a vertical fulcrum for said post and affording a means for retaining said post on said boss, a lamp carried by and extending outwardly from one side of said post, an operating arm extended at right angles from the other side of said post over said axle, a split clamp detachably secured to the reach rod of the vehicle steering gear, a part extended laterally from one portion of said clamp in the plane of said arm and provided with a longitudinal slot, and a pin carried by the arm and extending into the said slot affording an operating connection between said reach rod and lamp.

In testimony whereof I have signed my name to this specification.

RAYMOND A. PERRY.